(12) United States Patent
Terao et al.

(10) Patent No.: US 8,997,683 B2
(45) Date of Patent: Apr. 7, 2015

(54) INDICATOR DEVICE AND LIGHT-GUIDE MEMBER

(75) Inventors: Masanobu Terao, Shimada (JP);
Akihiro Oohata, Shimada (JP);
Katsuma Sano, Shimada (JP)

(73) Assignee: Yazaki Corporation, Tokyo (JP)

( * ) Notice: Subject to any disclaimer, the term of this patent is extended or adjusted under 35 U.S.C. 154(b) by 316 days.

(21) Appl. No.: 13/634,752

(22) PCT Filed: Jun. 14, 2011

(86) PCT No.: PCT/JP2011/063548
§ 371 (c)(1),
(2), (4) Date: Sep. 13, 2012

(87) PCT Pub. No.: WO2011/158814
PCT Pub. Date: Dec. 22, 2011

(65) Prior Publication Data
US 2013/0000543 A1    Jan. 3, 2013

(30) Foreign Application Priority Data

Jun. 16, 2010  (JP) ................................ 2010-137040

(51) Int. Cl.
| | |
|---|---|
| *G01D 11/28* | (2006.01) |
| *B60K 35/00* | (2006.01) |
| *G01D 13/26* | (2006.01) |

(52) U.S. Cl.
CPC ........... *B60K 35/00* (2013.01); *B60K 2350/203* (2013.01); *G01D 11/28* (2013.01); *G01D 13/265* (2013.01)

(58) Field of Classification Search
CPC ..... G01D 11/28; G01D 13/265; B60K 35/00; B60K 2350/203
USPC .............. 116/286, 287, 288, DIG. 5, DIG. 6, 116/DIG. 36; 362/23.19, 23.2, 23.21, 23.01, 362/23.18
See application file for complete search history.

(56) References Cited

U.S. PATENT DOCUMENTS

| | | | | |
|---|---|---|---|---|
| 2,287,605 | A | * 6/1942 | Dickson et al. | ............... 116/62.3 |
| 6,598,988 | B1 | 7/2003 | Noll et al. | |

(Continued)

FOREIGN PATENT DOCUMENTS

| | | |
|---|---|---|
| JP | 55-71985 A | 5/1980 |
| JP | 09-101182 A | 4/1997 |

(Continued)

OTHER PUBLICATIONS

Notification of First Office Action dated Jan. 3, 2014, issued for the Chinese patent application No. 201180003998.5 and English translation thereof.

(Continued)

*Primary Examiner* — R. A. Smith
(74) *Attorney, Agent, or Firm* — Locke Lord LLP

(57) ABSTRACT

A light-guide indicator is provided with a base part, and an indicator main body extending along the indicator plate from one end of the base part. One end of a light-guide output shaft provided with a motor is arranged opposite to the other end of the base part, and the other end of the output shaft is arranged opposite to a light source. A back side of the indicator plate is provided with a light-guide member, and the light-guide member is provided with a first recess receiving the other end of the base part and a second recess receiving the one end of the output shaft. A bottom face of the first recess is arranged tapered in such a way that the bottom face approaches the output shaft as approaches rotation axis of the output shaft.

3 Claims, 5 Drawing Sheets

(56) References Cited

U.S. PATENT DOCUMENTS

| | | | |
|---|---|---|---|
| 2002/0108555 A1 | 8/2002 | Breinich et al. | |
| 2004/0012273 A1 | 1/2004 | Suzuki et al. | |
| 2005/0281040 A1 | 12/2005 | Birman et al. | |
| 2009/0038535 A1* | 2/2009 | Morales et al. | 116/288 |
| 2009/0196013 A1* | 8/2009 | Mezouari | 362/26 |
| 2013/0092077 A1* | 4/2013 | Akamatsu et al. | 116/286 |

FOREIGN PATENT DOCUMENTS

| | | | | |
|---|---|---|---|---|
| JP | 2003-515147 A | | 4/2003 | |
| JP | 2003240610 A | * | 8/2003 | ............ G01D 11/28 |
| JP | 2004-048892 A | | 2/2004 | |
| JP | 2005-300361 A | | 10/2005 | |
| JP | 2007121177 A | * | 5/2007 | ............ G01D 11/28 |
| JP | 2007-263827 A | | 10/2007 | |
| JP | 2010-048743 A | | 3/2010 | |
| JP | 2012122984 A | * | 6/2012 | ............ G01D 11/28 |
| JP | 2012181049 A | * | 9/2012 | ............ G01D 11/28 |
| JP | 2012251950 A | * | 12/2012 | ............ G01D 11/28 |
| JP | 2013024699 A | * | 2/2013 | ............ G01D 11/28 |
| JP | 2014219300 A | * | 11/2014 | ............ G01D 11/28 |

OTHER PUBLICATIONS

International Search Report dated Jul. 12, 2011, issued for PCT/JP2011/063548.

* cited by examiner

INDICATOR DEVICE AND LIGHT-GUIDE MEMBER

TECHNICAL FIELD

This invention relates to an indicator device and a light-guide member, and in particular, to an indicator device and a light-guide member including an indicator plate, a light-guide indicator provided with a base part and an indicator main body extending along the indicator plate from one end of the base part, a motor provided with a light-guide output shaft one end of which is arranged opposite to the other end of the base part, a light source arranged opposite to the other end of the output shaft.

BACKGROUND ART

There has been proposed as an indicator device mentioned above, e.g., what is shown in FIG. 6 (for example, see Patent Documents 1 to 3). As indicated in FIG. 6, the indicator device 100 includes an indicator plate 101, a light-guide indicator 102, a motor 103 rotating the indicator 102, and a light source 104 for lightening the indicator 102.

The indicator 102 is provided with a base part 102a and an indicator main body 102b extending along the indicator plate 101 from one end of the base part 102a. The motor 103 is pivotally provided with a light-guide output shaft. The output shaft 103a is fixed to the indicator 102, one end of which is press-fitted to the other end of the base part 102a. The light source 104 is arranged so as to oppose the other end of the output shaft 103a.

According to the indicator device 100 mentioned above, light emitted from the light source 104 is guided through the output shaft 103a into the base part 102a of the indicator 102, and the light guided into the base part 102a is guided within the indicator 102, brightening the indicator 102.

In the indicator device 100 mentioned above, in order to effectively guide light emitted from the light source 104 to the indicator 102 therethrough without leaking light out of the output shaft 103a, the indicator 102 can only be lightened thereby, and the indicator plate 101 is required to be lightened by another light source for the indicator plate other than the light source 104 for the indicator which is arranged on a back side of the indicator plate 101. This therefore requires a number of light sources and high cost.

PRIOR ART DOCUMENT

Patent Document

Patent Document 1: Japanese Unexamined Patent Application Publication No. 2003-515147
Patent Document 1: Japanese Unexamined Patent Application Publication No. 2004-48892
Patent Document 1: Japanese Unexamined Patent Application Publication No. 55-71985

DISCLOSURE OF THE INVENTION

Problem to be Solved by the Invention

Accordingly, an object of the present invention is to provide an indicator device and a light-guide member for achieving low cost by lightening both an indicator and an indicator plate using one light source.

Means for Solving the Problem

For attaining the object, according to the invention, there is provided an indicator device comprising an indicator plate, an light-guide indicator provided with a base part and an indicator main body extending along the indicator plate from one end of the base part, a motor provided with a light-guide output shaft one end of which is arranged opposite to the other end of the base part, a light source arranged opposite to the other end of the output shaft, and a light-guide member arranged on a back side of the indicator plate, and provided with a first recess receiving the other end of the base part and a second recess receiving the one end of the output shaft, wherein a bottom face of the first recess is arranged tapered in such a way that the bottom face approaches the output shaft as approaches rotation axis of the output shaft.

According to the invention, there is provided the indicator device recited in claim 1 further comprising a case accommodating the light-guide member, wherein the case including a bottom wall and a stand part supporting the indicator plate and standing from an edge of the bottom wall, wherein the bottom wall is provided with an insertion hole receiving the output shaft, and wherein an inside of the insertion hole is arranged tapered in such a way that the inside of the insertion hole approaches the output shaft as approaches rotation axis of the output shaft.

According to the invention, there is provided a light-guide member arranged between a base part of an indicator and an output shaft of a motor each end of which is arranged opposite to each other, the light-guide member comprising a first recess receiving an end of the base part, and a second recess receiving an end of the output shaft, wherein a bottom face of the first recess is arranged tapered in such a way that the bottom approaches the output shaft as approaches rotation axis of the output shaft.

Effects of the Invention

As discussed above, according to the invention, since the bottom face of the first recess disposed in the light-guide member is arranged tapered in such a way that the bottom face approaches the output shaft as approaches rotation axis of the output shaft, an light entering into the light-guide member through the output shaft is reflected on the bottom face of the first recess to enter the back face of the indicator plate. Both the indicator and the indicator plate are therefore lightened by one light source, leading to lower cost.

According to the invention, since the inside of the insertion hole is arranged tapered in such a way that the inside of the insertion hole approaches the output shaft as approaches rotation axis of the output shaft, light reflected on the bottom face of the first recess toward an inside face of the insertion hole is reflected on the inside face of the insertion hole toward the back face of the indicator plate. Therefore, the light reflected on the bottom face of the first recess can effectively be guided to the back face of the indicator plate.

According to the invention, since the bottom face of the first recess is arranged tapered in such a way that the bottom face approaches the output shaft as approaches rotation axis of the output shaft, inserting the end of the base part into the first recess and the end of the output shaft into the second recess, and arranging the light-guide member on the back face of the indicator plate allows light entering the light-guide member through the output shaft to reflect on a bottom of the first recess to enter into the bottom face of the indicator plate. Both the indicator and the indicator plate are therefore lightened by one light source, leading to lower cost.

DESCRIPTION OF EMBODIMENTS

Hereinafter, an indicator device of the present invention will be explained with reference to FIGS. 1 to 5. A vehicle indicator 1 on which an indicator device according to the present invention is mounted on a mobile object such as a vehicle to indicate state of the mobile object for a passenger in the vehicle.

Figure 1:
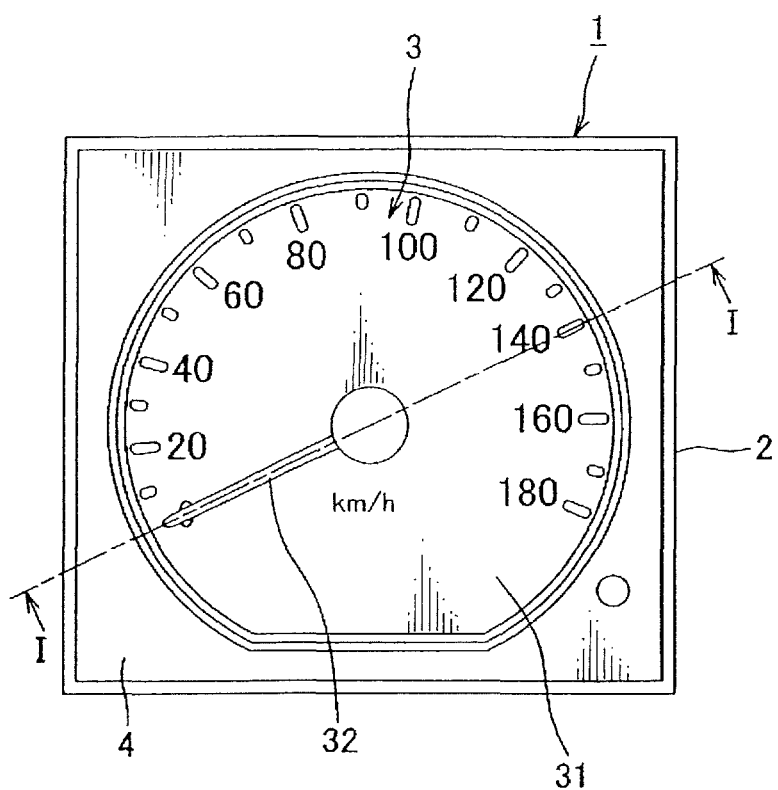
FIG. 1 is a front view illustrating one embodiment of a vehicle indicator in which an indicator device according to the present invention is mounted.

The vehicle indicator 1, as shown in FIG. 1, is provided with a case 2, an indicator device 3, and a facing 4. The case 2 is made of synthetic resin and accommodates the indicator device 3 therewithin described below.

Figure 2:
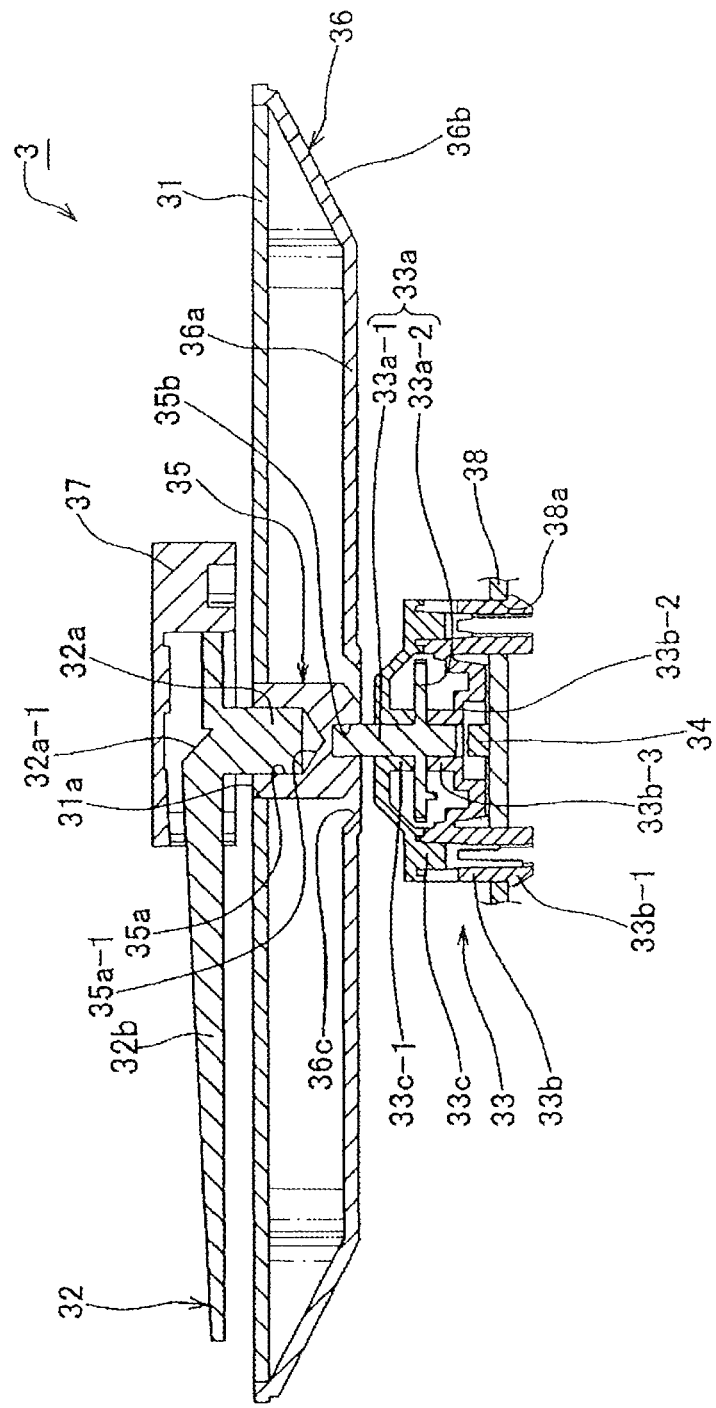
FIG. 2 is a sectional view along I-I line in FIG. 1.

The indicator device 3, as shown in FIG. 2, provided with an indicator plate 31, a light-guide indicator, a motor 33 for rotating the indicator 32, a light source 34 brightening the indicator 32, a light-guide member 35 disposed between a base part 32a of the indicator 32 and an output shaft 33a of a motor 33 mentioned below, and a case 36 accommodating the light-guide member 35.

The indicator plate 31 is made of optical transparent material such as acrylic, and a light shielding film is formed on a surface thereof. The light shielding film is cut out along indication designs such as characters or scales. When light enters from a back face of the indicator plate 31, the light can thus passes through the indication designs, reaching to the passenger, which allows the indication designs to brighten so as to be observed. The indicator plate 31 is formed disciform, and in the center thereof a base part 32a of the indicator 32 and a through hole 31a passing the light-guide member 35 are formed.

The indicator 32 is made of light-guide material such as acrylic. The indicator 32 is integrally provided with the base part 32a arranged in the direction perpendicular to the indicator plate 31, and an indicator main body 32b extending along the indicator plate 31 from one end of the base part 32a. One end of the base part 32a is provided with a tapered reflection face 32a-1 in such a way that the tapered reflection face 32a-1 approaches the front as approaches a tip of the indicator main body 32b. Light entering from the other end of the base part 32a is reflected on the reflection face 32a-1, and guided into a tip side of the indicator main body 32b. The one end of the base part 32a is covered by a cap 37 so as not to be observed from the front.

The motor 33 is attached to a printed wiring board 38 disposed on a back side of the indicator plate 31. The motor 33 is attached to the printed wiring board 38 facing the indicator plate 31. The motor 33 is provided with a motor main body (not shown), the output shaft 33a, a lower case 33b, and an upper case 33c.

The motor main body (not shown) is, e.g., a well-known stepping motor, and rotates a driving axis (not shown) when the power is supplied. The output shaft 33a is made of light-guide material such as acrylic, and integrally provided with an output shaft main body 33a-1 and an output gear 33a-2 engaging with a gear fixed to a driving axis of the motor main body. When the power is supplied, the motor main body rotates the driving axis, and the rotation force is transmitted to the output shaft main body 33a-1 via the output gear 33a-2, causing the output shaft main body 33a-1 to rotate. The output shaft main body 33a-1 and the base part 32a of the indicator 32 are concentrically arranged, and one of the output shaft main body 33a-1 and the other of the base part 32a of the indicator 32 are arranged opposite to each other.

The lower case 33b and the upper case 33c are made of such synthetic resin, and accommodate the above-mentioned motor main body, the output shaft 33a and the like. The lower case 33b is formed in such a shape of tray as is open to the indicator 32 side, and is provided with a pair of rock legs 33b-1, a recess 33b-2, and an axis bearing 33b-3. The pair of rock legs 33b-1 is disposed to project toward the printed wiring board 38, and locked to the printed wiring board 38 when inserted into an attachment hole 38a provided with the printed wiring board 38.

The upper recess 33b-2 is disposed concavely toward the indicator 32 side in the middle of the lower case 33b. A light source 34 is accommodated in a space between the recess 33b-2 and the printed wiring board 38. The recess 33b-2 is provided with a through bore, and axis bearing 33b-3 stands toward the indicator 32 from an edge of the bore through. The axis bearing 33b-3 pivotally supports the output shaft main body 33a-1 side where the printed wiring board 38 is nearer than the output gear 33a-2.

The upper case 33c is formed in a shape of tray, which is attached to the lower case 33b in such a way as to cover opening of the lower case 33b. The upper case 33c is provided with a through bore in the upper wall thereof, from an edge of which a cylindrical axis bearing 33c-1 is disposed standing toward the light source 34 side. The axis bearing 33c-1 pivotally supports the output shaft main body 33a-1 side where the indicator 32 is nearer than the output gear 33a-2.

The light source 34 is made from, e.g., LED (light emitting device), mounted on the printed wiring circuit 38, and accommodated in the space between the recess 33b-2 and the printed wiring board 38 as mentioned above. Mounting the light source 34 on the printed wiring board 38 allows the light source 34 to be disposed opposite to the other end of the output shaft 33a. The light source 34 is also arranged on the printed wiring board 38 in such a way that a light axis of the light source 34 and rotation axis of the output shaft 33a and the base part 32a can be concentrically arranged.

Figure 3A:
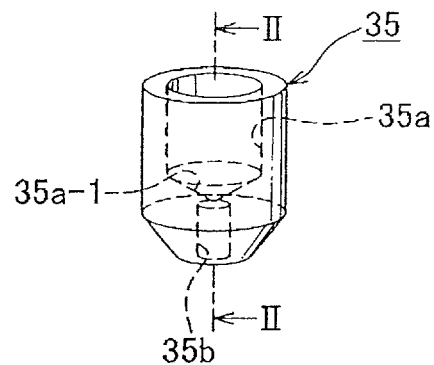
FIG. 3A is a perspective view illustrating a light-guide member shown in FIG. 2.
Figure 3B:
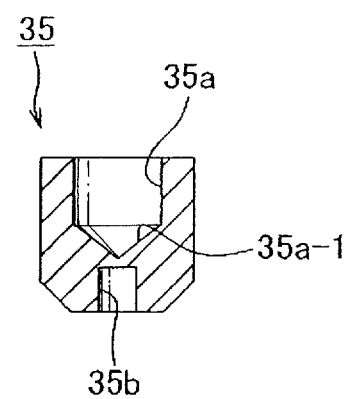
FIG. 3B is a sectional view along II-II line in FIG. 3A.
Figure 3C:
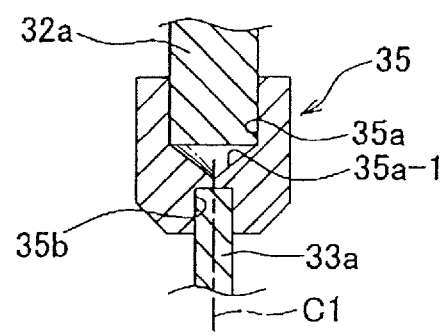
FIG. 3C is a partial enlarged view illustrating circumference of the light-guide member in FIG. 2.

The light-guide member 35 is made of light-guide material, e.g., acrylic. The light-guide member 35 is, as shown in FIGS. 3A to 3C, provided with a first recess 35a receiving the other end of the base part 32a and second recess 35b receiving the one end of the output shaft 33a, and disposed on a back face of the indicator plate 31. A bottom face 35a-1 of the first recess 35a is disposed tapered in such a way that the bottom face 35a-1 approaches the output shaft 33a as approaches the rotation axis C1 of the output shaft 33a.

Inserting the other end of the base part 32a into the first recess 35a of the light-guide member 35 and the one end of the output shaft 33a into the second recess 35b allows the other end of the base part 32a and the one end of the output shaft 33a to be fixed opposite to each other. When the motor is supplied with power, and the driving axis rotates, the rotation force is transmitted to the base part 32a of the indicator 32 via the gear, the output gear 33a-2, the output shaft main body 33a-1, and the light-guide member 35 that are fixed to the driving axis, rotating the indicator 32 around the base part 32a.

The case 36, as shown in FIG. 2, includes a bottom wall 36a and a stand 36b supporting the indicator plate 31 standing from the edge of the bottom wall 36a. In a space between the case 36 and the indicator plate 31 the light-guide member 35 is accommodated. The bottom wall 36a of the upper case 36 is provided with a through bore (insertion hole 36c into which the output shaft 33a is inserted, an inside of which is disposed tapered in such a way that the inside approaches the output shaft 33a as approaches the rotation axis C1 of the output shaft 33a. A surface of the case 36 facing the indicator plate 31 is treated reflectional with such as white coat.

Figure 4:
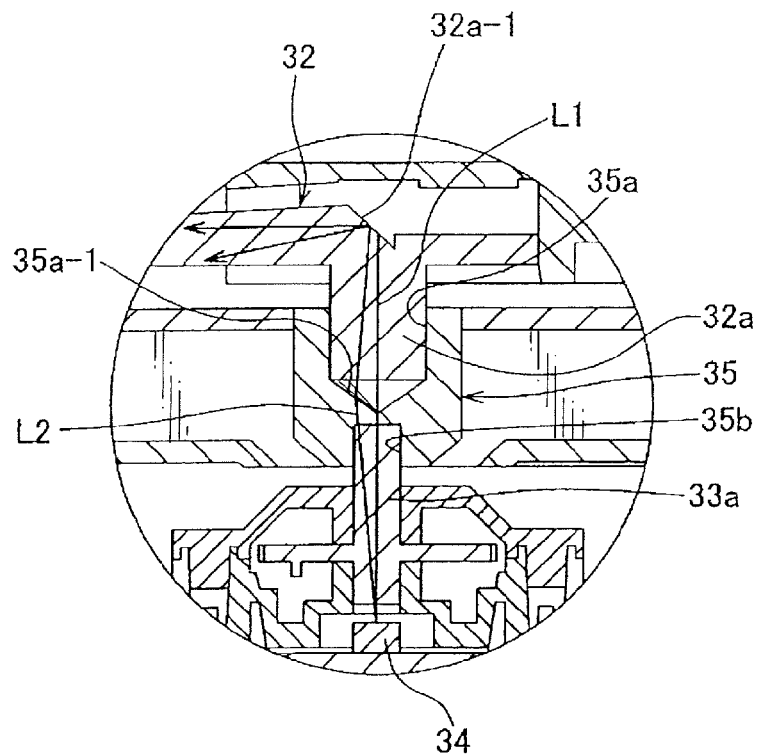
FIG. 4 is an explanatory view for explaining process that light emitted from a light source shown in FIG. 2 brightens the indicator.
Figure 5:
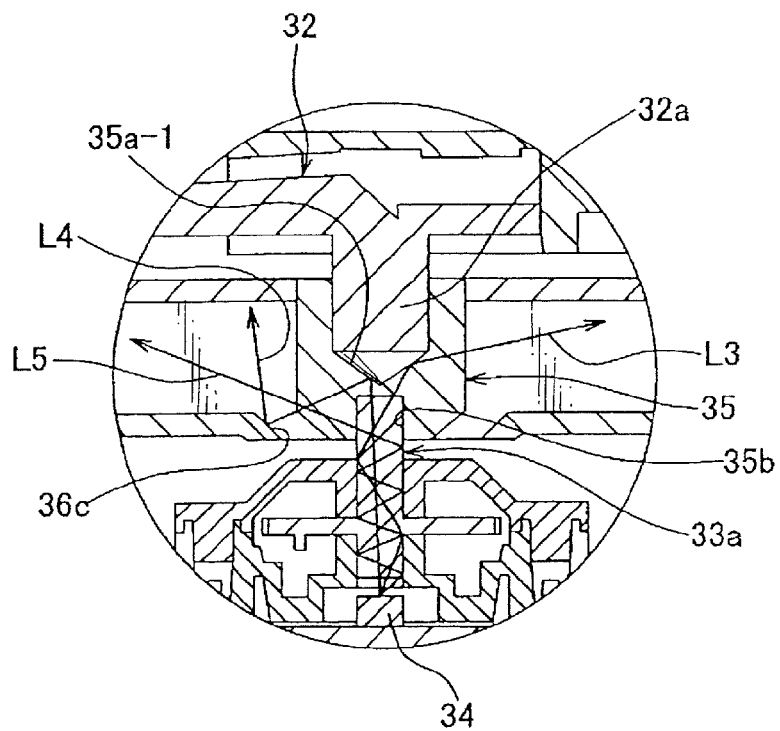
FIG. 5 is an explanatory view for explaining process that light emitted from a light source shown in FIG. 2 brightens the indicator.
Figure 6:
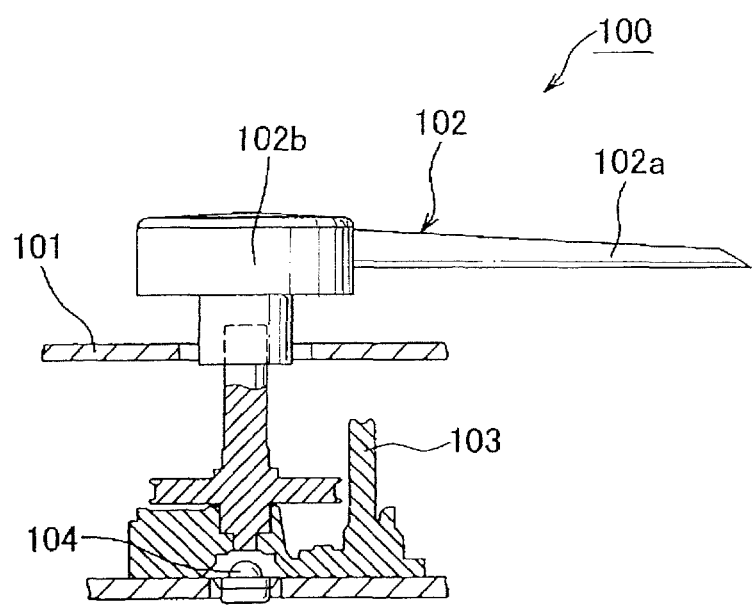
FIG. 6 is a partial sectional view illustrating one conventional indicator device.

Then, the process will be discussed with reference to FIGS. 4 and 5 in which the light source 34 of the vehicle indicator 1 mentioned above can brighten the indicator 32. Partial lights L1 and L2 emitted from light source 34, as shown in FIG. 4, enter into the output shaft 33a from the other end of the output shaft 33a opposite to the light source 34, and are guided within the light-guide member 33a along the rotation axis of the output shaft 33a. The lights L1 and L2 then enter into the light-guide member 35 from the one end of the output shaft 33a, passing through the tapered bottom face 35a-1 of the first recess 35a, and enter into the base part 32a from the one end of the base part 32a of the indicator 32. The lights L1 and L2 entering into the one end of the base part 32a are reflected on a reflection face 32a-1, then guided into a tip of the indicator main body 32b, which allows the whole indicator to brighten so as to be observed.

Partial lights L3, L4 and L5 emitted from the light source 34, as well as the light L1 and L2, enter into the output shaft 33a from the other end of the output shaft 33a opposite to the light source 34, passing for the one end of the output shaft 33a while passing through along the rotation axis of the output shaft 33a or reflecting on sides of the output shaft 33a.

Partial lights L3 and L4 passing for the one end of the output shaft 33a are emitted from the one end of the output shaft 33a, then entering into the light-guide member 35, and are reflected on the tapered bottom face 35a-1 toward a side away from the rotation axis of the output shaft 33a or the base part 32a. Partial light L3 reflected on the tapered bottom face 35a-1 passes for the indicator plate 31 side, passing through a side of the light-guide member 35, and enters into a back side of the indicator plate 31. Partial light L4 reflected on the tapered bottom face 35a-1 passes for an opposite side of the indicator plate 31, passing through a side of the light-guide member 35, and is then reflected on an inside of the through bore 36c before entering a back side of the indicator plate 31.

Partial light L5 passing for the one end of the output shaft 33 a while reflecting on the sides of the output shaft 33 a is guided through at a portion where the light-guide member 35 is inserted into the second recess 35 b, passing through the side of the output shaft 33 a, and enters into the light-guide member 35. The light L4 entering into the light-guide member 35 passes through the side of the light-guide member 35 and enters into the back side of the indicator plate 31. These lights L1 to L5 can brighten the indicator plate 35.

According to the vehicle indicator 1 mentioned above, the bottom face 35a-1 of the first recess 35a provided with the light-guide member 35 is disposed tapered in such a way that the bottom face 35a-1 approaches the output shaft 33a as approaches the rotation axis of the output shaft 33a, resulting in that light entering into the light-guide member 35 after passing through the output shaft 33a is reflected on the bottom face 35a-1 of the first recess 35a, then entering into the back side of the indicator plate 31. Therefore, one light source 34 can lighten both the indicator 32 and the indicator plate 31, leading to lower cost.

According to the vehicle indicator 1 mentioned above, the inside of the through bore 36c is disposed tapered in such a way that the inside of the through bore 36c approaches the output shaft 33a as approaches the rotation axis of the output shaft 33a, resulting in that light L4 reflected on the bottom face 35a-1 of the first recess 35a toward the inside of the through bore 36c is reflected on the inside of the through bore 36c toward the back side of the indicator plate 31. Therefore, light reflected on the bottom face 35a-1 of the first recess 35a can effectively be guided into the back side of the indicator plate 31.

Note that although according to the embodiment mentioned above the case 36 accommodating the light-guide member 35 is disposed, the present invention may not be limited therewithin. The case 36 may thus not be disposed.

Note that although according to the embodiment mentioned above the one light source 34 lightens both the indicator 32 and indicator plate 31, the present invention may not be limited therewithin. If a brightness of the indicator plate 31 lightened by one light source 34 is low, a new light source for the indicator plate 31 other than the light source 34 may be disposed. In this case, lightening the indicator plate 31 also by the light source 34 allows the number of the light source for the indicator plate to decrease more than before.

Since the embodiment mentioned above only indicates a typical configuration of the present invention, the invention may not be limited to these embodiments. Therefore, unless otherwise such changes and modifications depart from the scope of the present invention hereafter defied, they should be construed as being included therein.

REFERENCE SIGNS LIST 3 indicator device
31 indicator plate
32 indicator
32a base part
32b indicator main body
33 motor
33a output axis
34 light source
35 light-guide member
35a first recess
35a-1 bottom face
35b second recess
36 case
36c through bore.

The invention claimed is:

1. An indicator device comprising:
an indicator plate;
a light-guide indicator provided with a base part and an indicator main body extending along the indicator plate from one end of the base part;
a motor provided with a light-guide output shaft, one end of the output shaft being arranged opposite to the other end of the base part;
a light source arranged opposite to the other end of the output shaft; and
a light-guide member arranged on a back side of the indicator plate and provided with a first recess receiving the other end of the base part and a second recess receiving the one end of the output shaft,
wherein a bottom face of the first recess is arranged tapered in such a way that the bottom face approaches the output shaft as approaches rotation axis of the output shaft, and is disposed below the back side of the indicator plate.

2. The indicator device as claimed in claim 1, further comprising a case accommodating the light-guide member, the case including a bottom wall and a stand part supporting the indicator plate and standing from an edge of the bottom wall, the bottom wall being provided with an insertion hole receiving the output shaft, wherein an inside of the insertion hole is arranged tapered in such a way that the inside of the insertion hole approaches the output shaft as approaches rotation axis of the output shaft.

3. The indicator device as claimed in claim 1, light reflected on the bottom wall of the first recess lights the indicator plate from the back side of the indicator plate.

* * * * *